United States Patent [19]

Marcott

[11] Patent Number: 5,054,599
[45] Date of Patent: Oct. 8, 1991

[54] END OF FILL DETECTOR FOR A HYDRAULIC CLUTCH

[75] Inventor: Tony L. Marcott, Peoria, Ill.

[73] Assignee: Caterpillar Inc., Peoria, Ill.

[21] Appl. No.: 632,906

[22] Filed: Dec. 24, 1990

[51] Int. Cl.⁵ .................. F16D 25/14; F15B 13/00
[52] U.S. Cl. .................................. 192/85 R; 91/361;
137/625.64; 192/109 F; 361/159
[58] Field of Search .............. 192/109 F, 85 R;
91/361; 361/154, 159, 186; 137/625.64

[56] References Cited

U.S. PATENT DOCUMENTS

| | | | |
|---|---|---|---|
| 3,295,421 | 1/1967 | McCormick | 361/154 X |
| 4,135,610 | 1/1979 | Chatterjea | 192/109 F X |
| 4,707,789 | 11/1987 | Downs et al. | 364/424.1 |
| 4,785,849 | 11/1988 | Masuda | 137/625.64 |
| 4,855,911 | 8/1989 | Brekkestran et al. | 364/424.1 |
| 4,871,048 | 10/1989 | Chatterjea | 192/3.58 |
| 4,936,167 | 6/1990 | Mehta | 74/866 |
| 4,942,787 | 7/1990 | Aoki et al. | 192/109 F X |
| 4,949,264 | 8/1990 | Katayama et al. | 192/109 F X |

FOREIGN PATENT DOCUMENTS

| | | | |
|---|---|---|---|
| 61-157418 | 1/1988 | Japan . | |
| 0279148 | 11/1989 | Japan | 192/85 R |
| 88/07636 | 6/1988 | World Int. Prop. O. | 192/85 AA |

OTHER PUBLICATIONS

K-Atomics Brochure, Komatsu (undated).

*Primary Examiner*—Rodney H. Bonck
*Attorney, Agent, or Firm*—James R. Yee

[57] ABSTRACT

An apparatus is adapted to detect an end-of-fill condition of an actuator having a varying control volume, C. The apparatus includes a solenoid having a coil and an armature. The armature is movable relative to the coil in response to energization of the coil. A control valve delivers a flow of fluid to the actuator. The rate of the fluid flow is responsive to the movement of the armature. An electrical circuit detects a voltage spike across the coil and responsively produces an end-of-fill signal. The voltage spike is generated by an electromotive force produced by the armature in response to the control volume achieving a predetermined end-of-fill pressure.

17 Claims, 4 Drawing Sheets

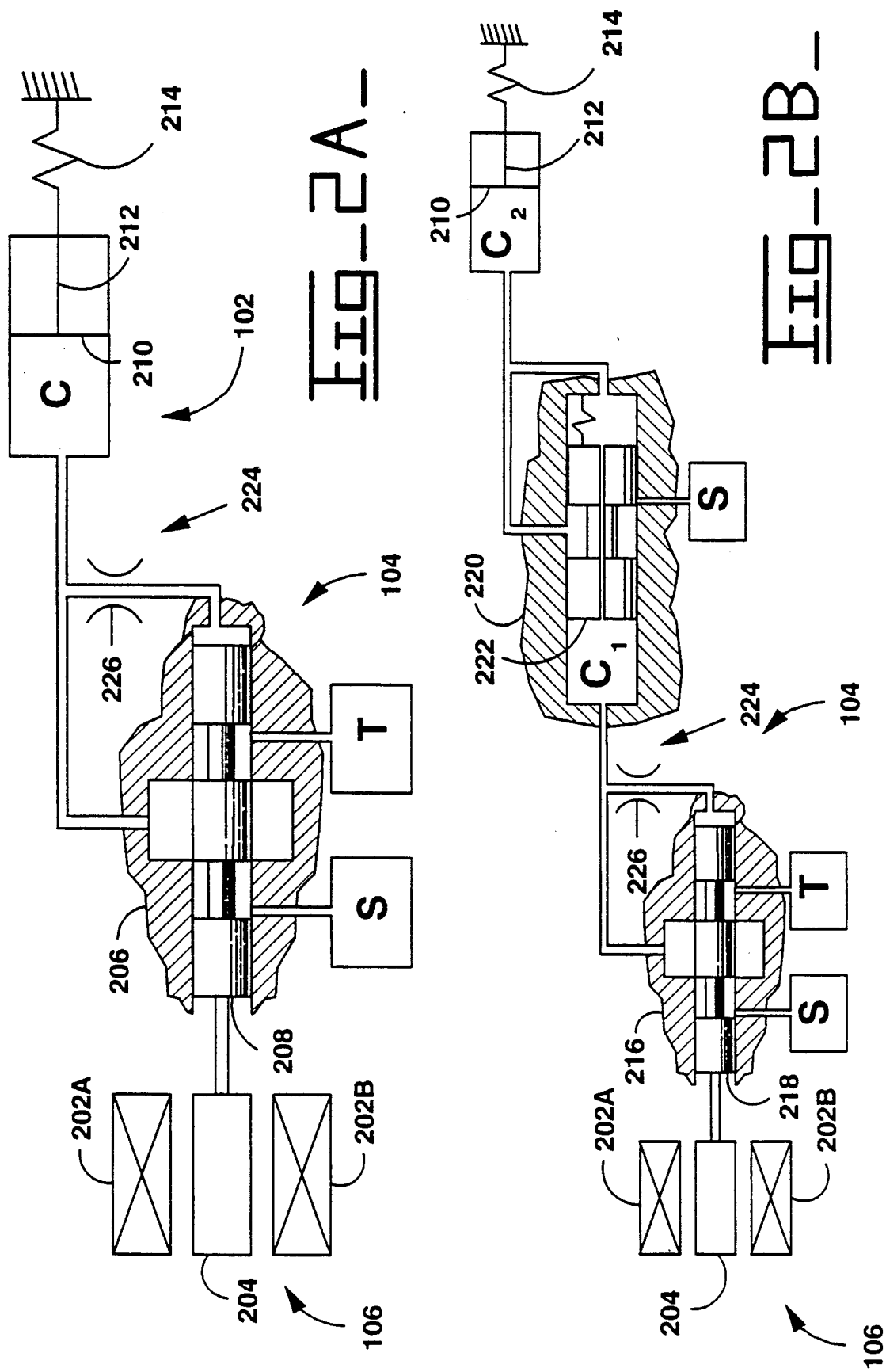

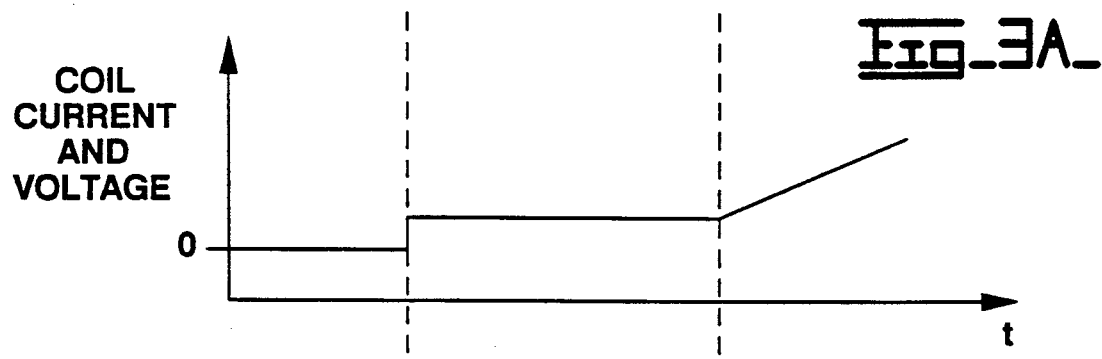
Fig_3A_
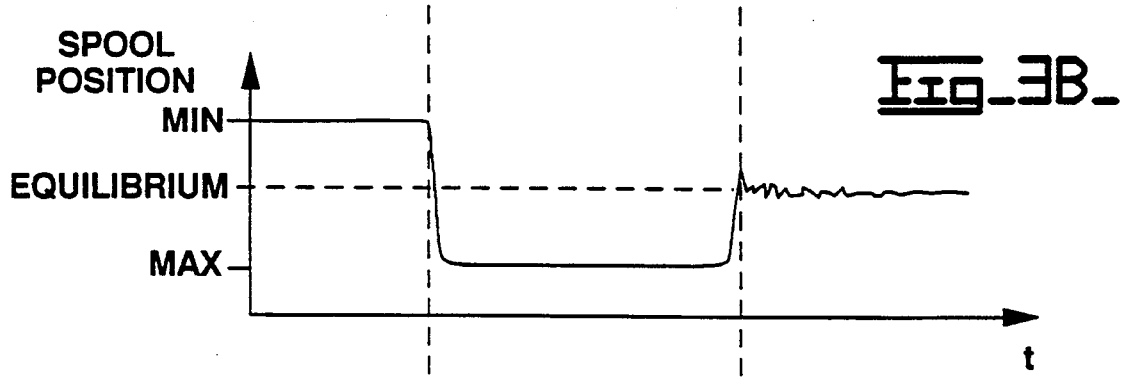
Fig_3B_
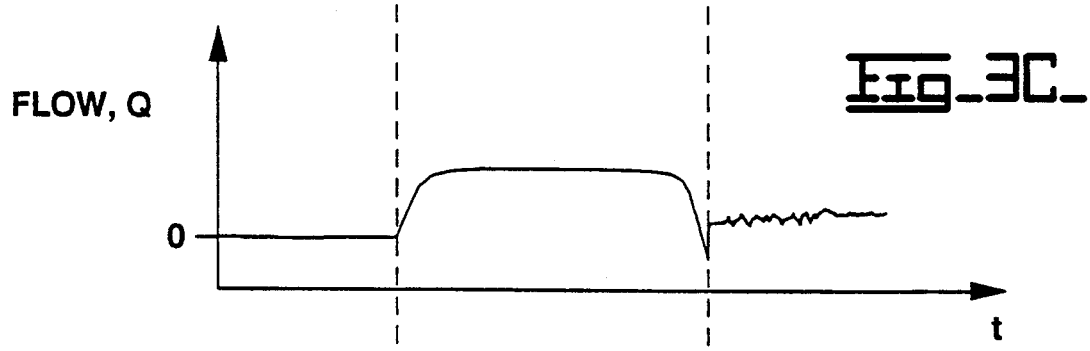
Fig_3C_
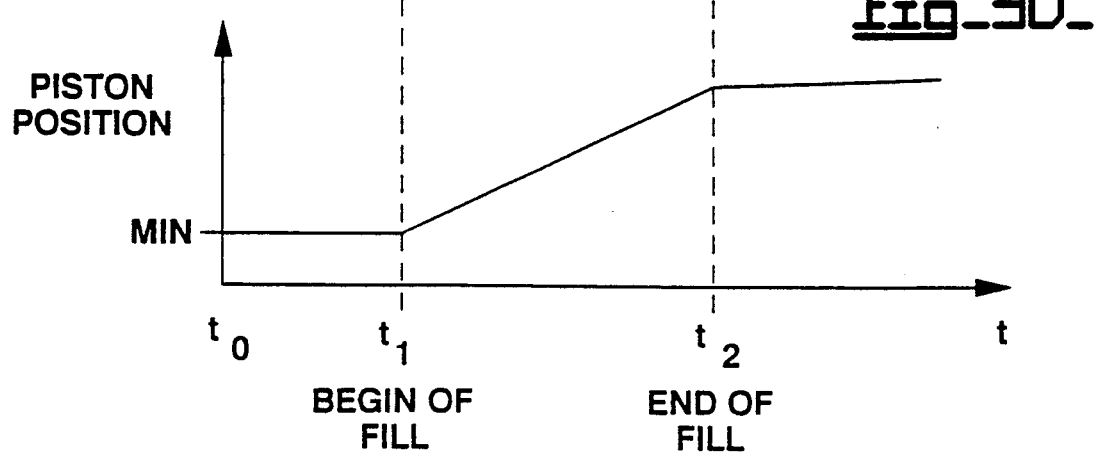
Fig_3D_

END OF FILL DETECTOR FOR A HYDRAULIC CLUTCH

DESCRIPTION

1. Technical Field

This invention relates generally to an apparatus and method for detecting an end-of-fill condition for a hydraulic actuator and more particularly, to an apparatus and method for detecting an EMF signal in a solenoid caused by the end-of-fill condition.

2. Background Art

Electronic control systems are particularly well suited for applications in which operating conditions or parameters change. Electronic transmission controllers, for example, are becoming more prevalent because of their suitability for handling the complex tasks required for the shifting of a transmission between gear ratios.

Usually, electronic solenoids are used for the engagement/disengagement of the transmission's clutches. The engagement of a hydraulic clutch consists of two stages: the fill mode and the pressure modulation mode. In the fill mode, the clutch volume is filled with hydraulic fluid. In the pressure modulation mode, the pressure within the clutch volume is modulated (increased) to a pressure level to ensure proper and full engagement of the clutch. To actuate the clutch, the solenoid is therefore, first energized to begin filling the clutch. When the clutch is filled, the current applied to the solenoid is modulated (typically, in an increasing linear ramp function) to continue the flow of hydraulic fluid to the clutch and, thereby, increase the pressure to a level sufficient to properly engage the clutch.

Typically, a timing strategy has been used to determine when the clutch has reached the end of fill condition. In this situation, the solenoid's coil would be energized and the clutch would begin to fill with hydraulic fluid. After a predetermined time period, the transmission controller would begin to modulate current, in an effort to fully engage the clutch.

This procedure has several limitations. For example, operating conditions change the actual time required to fill the clutch. Since pump flow is a function of engine speed, pump flow will vary with engine speed. Other factors (for example, other hydraulic systems being supplied by the pump) may also affect pump flow. As the pump flow varies, the time required to fill the clutch will also vary. Other operating conditions which affect the clutch fill times are present gear ratio, desired gear ratio, transmission load, and inclination of the vehicle.

Variations in the engine and operating characteristics of the transmission components can be expected over the life of the vehicle due to wear. This will also affect the clutch fill time.

Furthermore, the variations in the system components, including the clutches, due to manufacturing tolerances will also affect clutch fill time.

If the proper fill time is not known or accurately estimated, the clutch will be in a overfill or underfill condition when the controller attempts to modulate clutch pressure to fully engage the clutch.

Operation of the transmission by modulating the clutch pressure in a underfill or overfill condition will cause a "jerky" shift action and increase the rate at which wear and tear occurs.

In an attempt, to predict fill times, it is known to add sensors to the transmission controller. For example, U.S. Pat. No. 4,707,789 issued to Robert C. Downs et al., on Nov. 17, 1987, uses a transmission input speed sensor to detect underfill/overfill condition. The time delay used to estimate clutch fill is adjusted based upon the transmission input speed. However, transient changes, that is, changes in the operating conditions that the controller has not adapted to, will affect the shift quality. Furthermore, a transient condition will have a negative effect on the fill time for the next shift without the transient condition.

In another attempt to accurately predict the end of fill condition, it is known to add additional valves to the controller. One such system is shown in the Komatsu technical guide, "K-ATOMICS Komatsu-Advanced Transmission with Optimum Modulation Control". A flow sensing valve is used to sense a pressure differential. The spool of the flow sensing valve closes a switch in response to the pressure differential, thereby, signalling the end of fill condition. In still another attempt, hydraulic pressure is used to predict the end of fill condition. U.S. Pat. No. 4,942,787 issued to Takashi Aoki et al, on July 24, 1990 discloses the use of a pressure detection switch for that purpose. However, the cost added by the additional components in both these systems, plus, the added manufacturing cost due to the increased complexity, make these systems undesirable.

The present invention is directed at overcoming one or more of the problems as set forth above.

DISCLOSURE OF THE INVENTION

In one aspect of the present invention, an apparatus for detecting an end-of-fill condition of an actuator having a varying control volume is provided. The apparatus includes a solenoid having a coil and an armature. The armature is movable relative to the coil in response to energization of the coil. A control valve delivers a flow of fluid to the actuator. The rate of the fluid flow is responsive to the movement of said armature. An electrical circuit detects a voltage spike across the coil and responsively produces an end-of-fill signal. The voltage spike is generated by an electromotive force produced by the armature in response to said control volume achieving said predetermined end-of-fill pressure.

In another aspect of the present invention, a method for detecting an end-of-fill condition of an actuator is provided. The actuator has a varying control volume and the end-of-fill condition corresponds to the varying control volume being pressurized to a predetermined end-of-fill pressure. The varying control volume is connected to a source of pressurized fluid by a control valve. The control valve is actuatable by a solenoid having a coil and an armature. The method includes the steps of energizing the coil with a first current, delivering a flow of fluid from the pressurized fluid to the actuator in response to the energization of the coil with the first current, and detecting a voltage spike in the coil and responsively producing an end-of-fill signal.

BRIEF DESCRIPTION OF THE DRAWING

FIG. 2A is a diagrammatical view of a single stage solenoid operated clutch cylinder;

FIG. 2B is a diagrammatical view of a solenoid operated clutch cylinder having a dual stage spool valve design;

FIG. 3A is an exemplary graph illustrating coil current and during clutch actuation;

FIG. 3B is an exemplary graph illustrating spool position during clutch actuation;

FIG. 3C is an exemplary graph illustrating fluid flow during actuation;

FIG. 3D an exemplary graph illustrating clutch position clutch actuation; and

BEST MODE FOR CARRYING OUT THE INVENTION

Figure 1:
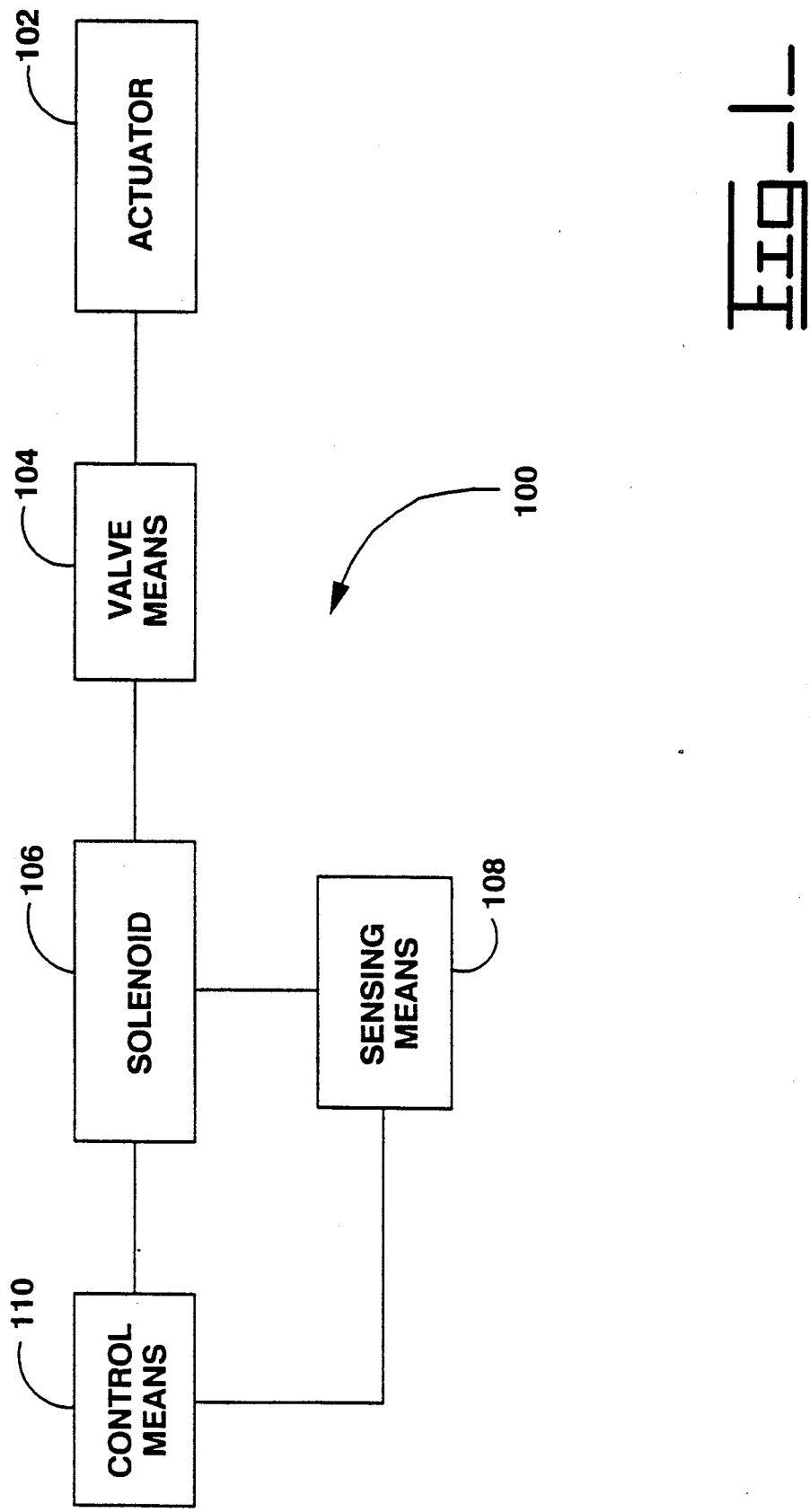
FIG. 1 is a block diagram of a clutch and a control system having an end of fill detector according to the invention.

With reference to FIG. 1, the present invention 100, hereinafter referred to as an end-of-fill detector, is adapted to controllably detect an end-of-fill condition of an actuator 102. In the preferred embodiment, the actuator 102 is a electrically operated solenoid actuated hydraulic clutch. A control means 110 produces a signal to engage the clutch 102.

For example, on one embodiment, the control means 110 is a transmission controller adapted to controllably engage and disengage the clutches of a vehicle's transmission. The transmission controller 110 receives signals indicative of certain parameters of the vehicle (for example, engine speed, accelerator pedal position, and ground speed) and generates signals to engage/disengage the clutches in accordance with a set of shifting rules. Typically, such controllers include a microcontroller or microcomputer. Many variations of such transmission controllers are well known in the art and are therefore not discussed further.

In the preferred embodiment, the signal from the transmission controller 110, is a current applied to the coil of an electrical solenoid 106. A valve means 104 delivers hydraulic fluid from a source of pressurized fluid to the clutch 102 in response to the current applied to the coil of the electrical solenoid 106.

As hydraulic fluid is delivered to the clutch 102, the clutch or control volume increases to a maximum or near maximum level. Since hydraulic fluid is still being delivered to the clutch 102, the clutch pressure rises rapidly. A reverse pressure differential is created within the valve means 104. The reverse pressure differential creates a voltage spike across the solenoid 106 (see discussion below). A sensing means 110 detects the voltage spike and produces an end-of-fill signal.

With reference to FIG. 2A, the solenoid 106 includes a coil 202, modeled as two boxes 202A,202B, and an armature 204. In the preferred embodiment, the valve means 104 includes a spool (control) valve 206. The spool valve 206 is connected between the clutch 102 and a source of pressurized fluid S, and includes a spool 208. The spool 208 is connected to the armature 204 of the solenoid 106. When no current is being applied to the solenoid 106, the spool valve 206 is said to be in a no-flow position. That is, there is no fluid flow between S and the clutch volume, C. When maximum fluid flow is allowed between S and C, the spool valve is said to be in a full flow position. A tank of hydraulic fluid T, is also provided to allow the clutch 102 to drain. The pressurized hydraulic fluid is created by a pump arrangement (not shown). Many such arrangements are known in the art, and are therefore not further discussed.

A clutch volume, C, is defined by the walls of the clutch 102 and a piston 210. The clutch 102 includes a number of clutch plates (not shown). When the clutch volume, C, is pressurized to its end-of-fill pressure, the clutch plates are pinned together and the clutch 102 is said to be engaged. For the purpose of illustration, the clutch plates are modeled by a rod 212 and a spring 214. The spring 214 acts to bias the piston 210 to the left, thereby acting to decrease the clutch volume and to disengage the clutch 102.

Feedback means 224 provides a restricted flow of fluid from the clutch volume, C back to the valve means 104. In the preferred embodiment, the feedback means 224 includes a restrictive orifice 226.

With reference to FIGS. 3A–3D, graphical representations of the coil current (and voltage), the flow of hydraulic fluid to the clutch 102 (Q), spool position, and clutch position are shown for the purpose of illustrating the operation of the end-of-fill detector 100 during a typical fill operation.

At time, $t_0$, the clutch 102 is disengaged, coil current and voltage are zero (0), there is no flow of hydraulic fluid to the clutch, the spool is at its minimum position, and the piston is at its minimum position. Before $t_0$, the clutch 102 is said to be fully disengaged.

Prior time $t_1$, the controller 110 signals the solenoid 106 to actuate the valve means 104 and to fill (engage) the clutch 102. In the preferred embodiment, the controller 110 includes a pulse width modulated (PWM) solenoid driver for controlling the current supplied to the coil 202. The operation of the PWM driver is discussed below.

At $t_1$, the PWM solenoid driver delivers a first current level to the coil 202, as shown in FIG. 3A. The current within the coil 202 creates an electromotive force (EMF) within the solenoid 202. The armature 204 is movable relative to the coil 202 and in response to the EMF. To begin filling the clutch volume, the first current level from the PWM driver acts to move the armature 204 and therefore, the spool 208, from the minimum or original position towards a maximum position, see FIG. 3B. In the maximum position, maximum flow between S and C is allowed (see FIG. 3C).

As shown in FIG. 3D, the flow of hydraulic fluid into the clutch volume acts against the piston 210 and the spring 214, moving the piston 210 (also to the right), and thereby, increasing the clutch volume.

As the piston 202 moves to the right, the clutch plates begin to compress. At time $t_2$, the piston is near its maximum position, the clutch plates are nearly locked, the pressure within the clutch volume increases sharply due to the increased resistance from the clutch plates and the continued flow of hydraulic fluid from S. This pressure flux creates a transient reverse pressure differential across the spool valve 206. The reverse pressure differential causes a rapid displacement, to the left in FIG. 2A, of the spool in the opposite direction of movement imposed by the EMF. The spool displacement caused by the pressure differential creates a transient voltage across the coil 202. The transient voltage is detected by the sensing means 108 and corresponds to an end-of-fill condition of the clutch 102.

For large clutches, a multistage design may be needed to gain the benefits of higher fluid flow. With reference to FIG. 2B, a dual stage spool valve design includes a first spool or pilot valve 216 and a second spool or control valve 220. The solenoid 204 is connected to the first spool 218 of the first spool valve 216. The first spool 218 is movable in response to energization of the coil 202 and allows fluid to flow from S to the first control volume, $C_1$. The first spool valve 216 controls the flow of fluid to a second control volume, $C_2$ (the clutch volume). The control valve 220 has a second spool 222. The second spool 222 allows fluid to flow from the first control volume, $C_1$ to the second control volume, $C_2$ through a conduit in the second spool 222. The second spool 222 is spring biased to close the path between the source, S and the clutch volume. The first spool valve 216 creates a pressure differential across the second spool valve 220. When the pressure differential becomes large enough to overcome the biasing force, the spool moves and fluid is allowed to pass directly from S to the clutch through the second spool valve 220.

There are many variations of such multistage designs with parameters suited to different applications. For example, different feedback schemes and spool designs will give the system different operating characteristics. Since the specific design of the valve means 104 is application specific and has no bearing on the present invention, no further discussion is given.

Figure 4:
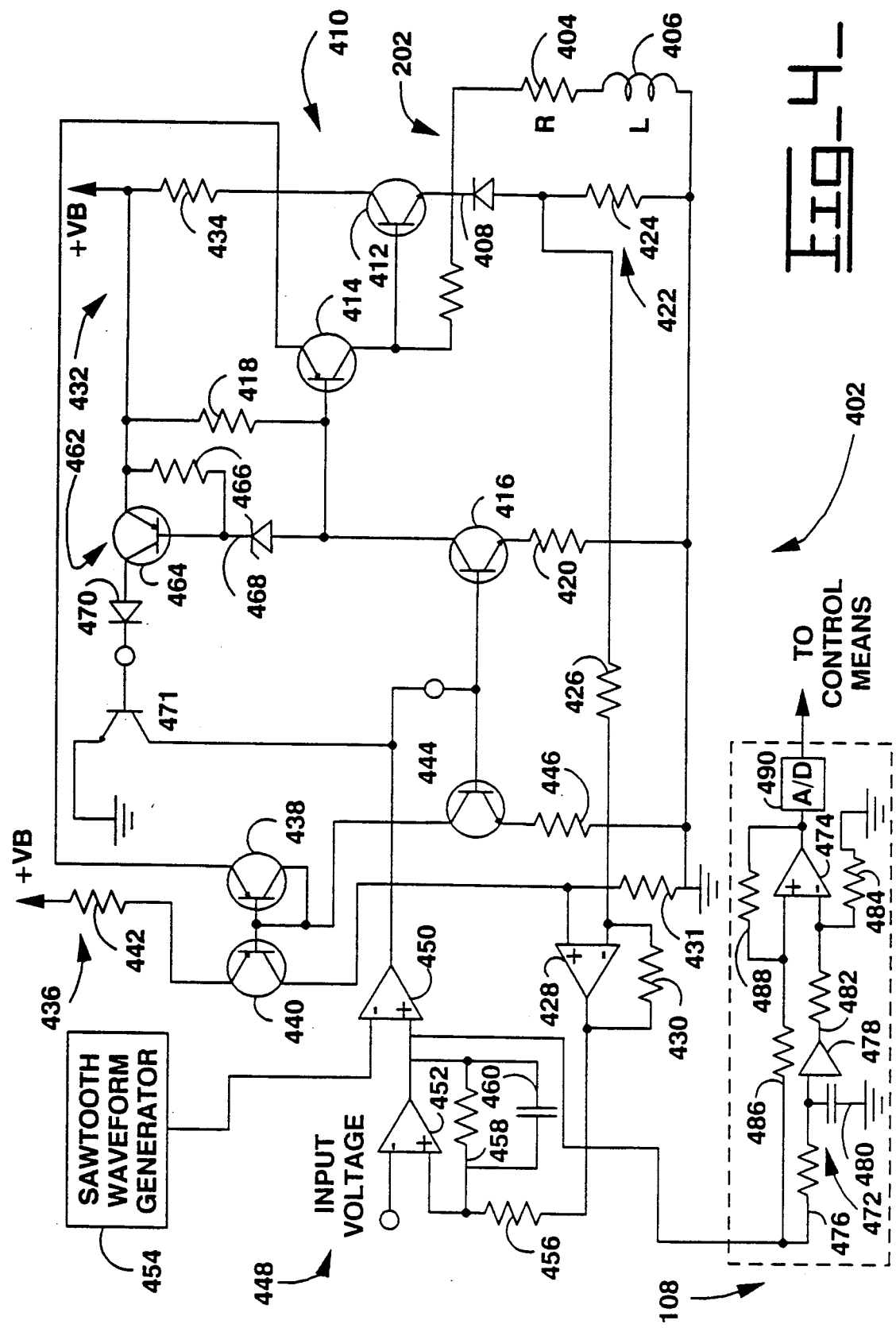
FIG. 4 is a schematic of a portion of the control system and the end-of-fill detector.

With reference to FIG. 4, an embodiment of the PWM driver 402 and the sensing means 108 are shown in detail. The PWM driver 402 controllably connects the solenoid 106 to a source of electrical power, $V_B$. The solenoid 106 represents a load having variable inductance and resistance to the PWM driver 402. The coil 202 of the solenoid 106 is modeled by an inductor 406 and a resistor 404. The inductor 406 and the resistor 404 have respective magnitudes of L and R. A reverse biased flyback diode 408 is connected in parallel with the coil 202. During energization of the coil 108, the flyback diode 408 is reverse biased by the positive reference of the source $V_B$ (hereafter referred to as $+V_B$) and no current flows through the diode 408; however, when the coil 202 is disconnected from $+V_B$, the diode 408 provides a discharge current path to prevent possible damage by large voltage spikes.

A first switching means 410 respectively connects and disconnects the coil 202 to and from $+V_B$ in response to receiving a first and second control signal. The first switching means 410 includes an npn power transistor 412 connected in a Darlington pair arrangement with a first pnp transistor 414 where the collector and emitter of the npn power transistor 412 are respectively connected to $+V_B$ and the coil 202. The base of the first pnp transistor 414 is connected to the collector of a first controlling transistor 416 and to $+V_B$ through a first resistor 418. The emitter of the first controlling transistor 416 is connected to the negative reference of the source $V_B$ (ground) through a second resistor 420.

When a first positive logic signal is applied to the base of the first controlling transistor 416, current flows from the supply voltage through the first resistor 418, first controlling transistor 416, and second resistor 420 to ground, the potential at the base of the first pnp transistor 414 decreases and turns the first pnp transistor 414 'on'. With the pnp transistor 'on', current flows from $+V_B$ through the first pnp transistor 414 to the base of the power transistor 412, whereby the potential at the base of the power transistor 412 becomes positive and biases the first power transistor 412 'on'. With the power transistor 412 'on', current flows through the power transistor 412, energizing the coil 202.

A first sensing means 422 senses the current flowing only through the flyback diode 408 and produces a signal having a magnitude responsive to the magnitude of the flyback current. The first means 422 includes a first current sensing resistor 424 connected between the anode of the flyback diode 408 and ground. The junction of the first current sensing resistor 424 and flyback diode 408 is connected through a third resistor 426 to a negative input of a first summing amplifier 428. A feedback resistor 430 is connected between an output and the negative input of the first summing amplifier 428. A ground resistor 431 connects the positive terminal of the first summing amplifier 428 to ground. With the power transistor 412 biased 'off', the energy stored in the coil 202 is dissipated through the first current sensing resistor 424 and flyback diode 408 in such a manner that the voltage drop across the first current sensing resistor 424 is negative relative to ground. Thus, the first summing amplifier 428, by virtue of the connection to the negative input, inverts and amplifies the negative signal from the first current sensing resistor 424 to produce a positive signal which has a magnitude responsive to the magnitude of the actual flyback current. The location of the first current sensing resistor 424 necessitates that only the flyback current will impact upon the voltage drop of the first current sensing resistor 424. The first current sensing resistor 424 is not positioned within the energization current path and will have zero voltage drop during energization of the coil 202.

A second sensing means 432 senses the current flowing only through the first switching means 410 and produces a signal having a magnitude proportional to the magnitude of the current in the first switching means 410. The second sensing means 432 includes a second current sensing resistor 434 connected between $+V_B$ and the collector of the power transistor 412. A current mirror circuit 436 is connected to the second current sensing resistor 434 such that the current flowing through the first current sensing resistor 434 is an input to the current mirror 436. The current mirror 436 includes second and third pnp transistors 438,440, wherein the base of both the second and third transistors 438,440 and the collector of the second pnp transistor 438 are connected together. The emitter of the second pnp transistor 438 is connected to $+V_B$ through the second current sensing resistor 434. The emitter of the third pnp transistor 440 is connected to $+V_B$ through a fourth resistor 442. The collector of the third pnp transistor 440 is connected to the non-inverting input of the first summing amplifier 428. The current mirror 436 produces an output current signal having a magnitude responsive to the magnitude of the current flowing through the second current sensing resistor 434 to the first summing amplifier. Selection of the ohmic value of the fourth resistor 442 relative to the value of the second current sensing resistor 434 determines the relationship between the input and output current of the mirror circuit 436. For example, with the current sensing resistor 434 having a value of 0.301 ohms +1% and the fourth resistor 442 having a resistive value of 0.301 ohms +1%, the output current of the mirror circuit 436 is directly proportional to the current delivered to the coil 202, but has a magnitude of only 1/1000th that of the energization current.

The interconnected bases of the second and third pnp transistors 438,440 are also connected to ground through a second controlling transistor 444 and fifth resistor 446. The base of the second controlling transistor 444 is connected to the base of the first controlling transistor 416, such that when the previously discussed first 'high' logic signal is applied to the base of the controlling transistors 416,444, the second controlling transistor 444 is biased 'on', connecting the bases of the controlling transistors 438,440 to ground, and enabling the current mirror 436 to deliver the output signal to the first summing amplifier 428. Conversely, a second 'low' logic signal delivered to the bases of the controlling transistors 416,444 biases both of the controlling transistors 416,444 'off', which disables the current mirror 436 and biases the power transistor 412, 'off'.

An input means 448 receives the flyback and switching current signals and delivers the first and second control signals to the first switching means 410 at a selected frequency and variable duty cycle. The duty cycle of the output signal is responsive to the magnitude of the output signal of the first summing amplifier 428. The input means 448 includes a comparator 450 which has a non-inverting input connected to the output of a second summing amplifier 452 and an inverting input connected a sawtooth waveform generator 454. The second summing amplifier 452 has a non-inverting terminal connected to the output of the first summing amplifier 428 through a sixth resistor 456 and to the output of the second summing amplifier 452 through a seventh resistor 458 and a first capacitor 460. The inverting input of the second summing amplifier 452 is connected to the control means 102. The control means supplies a controllable input voltage proportional to the desired level in the coil 202. The voltage output of the first summing amplifier 428 is proportional to the actual current flowing through the coil 202. The second summing amplifier 452 performs a comparison between the actual and desired currents and outputs a voltage (error) signal equivalent to the difference between the desired and actual current signals multiplied by a gain equal to the ratio of the seventh resistor 458 to the sixth resistor 456, plus an offset voltage equal to the controllable input voltage. For example, if the actual and desired current signals were equal then the output signal would be equal to the controllable input voltage. A positive error causes the output to decrease below the controllable input voltage and, conversely, a negative error results in an output which is greater than the controllable input voltage. The output of the second summing amplifier 452 is compared to the sawtooth waveform by the comparator 450 such that the output of the comparator 450 is a pulse width modulated constant frequency signal. The magnitude of the second summing amplifier 452 output determines the duty cycle output of the comparator 450. For example, if the output of the second summing amplifier 452 is 75% of the maximum value of the sawtooth waveform, which is indicative of a large error, then the output of the comparator 450 is 'high' for 75% of the cycle and 'low' for 25% of the cycle. Conversely, if the output of the second summing amplifier 452 is 25% of the maximum value of the sawtooth waveform, which is indicative of a small error, then the output of the comparator 450 is 'low' for 75% of the cycle and 'high' for 25% of the cycle.

Operation of the first and second current sensor means 16,38 are complementary in nature. Each can only deliver current during the period of time when the other is not operating. For example, the presence of flyback current indicates that the power transistor 412 is biased 'off' and that no current is flowing through the second current sensing resistor 434. Further, while the output of the first summing amplifier 428 is the sum of the two inputs, since neither input is simultaneously operational with the other, then the output is simply proportional to the individual inputs. The comparator 450 continually compares the magnitude of the output of the second summing amplifier 452 to the sawtooth waveform and is biased 'off' when the magnitude of the sawtooth waveform falls below the output of the amplifier 452. Similarly, the comparator 450 is biased 'off' when the magnitude of the sawtooth waveform rises above the output of the second summing amplifier 452.

A means 462 detects a short circuit condition of the coil 202 by monitoring the magnitude of the current delivered to the coil 202. The means 462 includes a fourth pnp transistor 464 which has an emitter connected to $+V_B$ and to the base of the fourth pnp transistor 464 through an eighth resistor 466. A Zener diode 468 is connected between the base of the fourth pnp transistor 464 and the collector of the first controlling transistor 416. The cathode of the Zener diode 468 is connected to the base of the fourth pnp transistor 464.

In a short circuit condition, excessive current flows to the coil 202, effectively, reducing the current flow through the first and eighth resistors 418,466 and causing the potential across the Zener diode 468 to decrease and turn the fourth pnp transistor 464 'on'. With transistor 464 biased 'on', $+V_B$ is connected through a protection diode 470 to the base of an npn transistor 471. The npn transistor 471 has an emitter connected to ground and a collector connected to the bases of the controlling transistors 416,444. During a short circuit condition, the npn transistor 471 is biased 'on', which ultimately biases the power transistor 412 'off', independent of the magnitude of the current in either the first or second current sensing means 422,432. With the power transistor 412 'off', the coil 202 cannot be energized.

As stated previously, the sensing means 108 detects an end of fill condition of the clutch 102. When the clutch 102 reaches the end of fill condition, a pressure differential across the spool valve creates a sizable transient change in the inductance of the coil 202. By monitoring the voltage across the coil 202, this inductance change can be detected by monitoring the voltage across the coil 202.

The coil 202 is modeled by the resistor 404 (R) and the inductor 406 (L). The voltage across the coil 202 is therefore:

$$V_C = (i \times R) + (L \times di/dt) + (i \times dL/dt) + v_{ecl},$$

where, i is the coil current, di/dt is the change in coil current with respect to time, dL/dt is the change in the inductance of the coil with respect to time, and $v_{ecl}$ represents the eddy current voltage losses within the coil.

The portion of $V_C$ caused by the EMF is:

$$\begin{aligned} V_{emf} &= V_C - (i \times R) \\ &= (L \times di/dt) + (i \times dL/dt) + v_{ecl}. \end{aligned}$$

By the differential equation chain rule:

$$dL/dt = pL/pi \times di/dt + pL/px \times dx/dt,$$

where,

L is a function of x and i, $pL/pi$, is the partial derivative of L with respect to i, and $pL/px$, is the partial derivative of L with respect to the spool position, x.

Through substitution:

$$V_{emf} = (L + i \times pL/pi) \times di/dt + (i \times pl/px) \times dx/dt + v_{ecl}.$$

The eddy current losses and the $\rho L/\rho i$ term are negligible for the control purpose and can be neglected. Therefore:

$$V_{emf} = i(\rho L/\rho x)dx/dt.$$

The latter equation proves that the cause of the voltage spike across the coil 202 is a function of the coil current, the change in the inductance of the coil 202 with respect to the spool position (x), and the change in the spool position with respect to time.

Referring again to FIG. 4, the control means 102 includes a highpass filter 472 and a difference amplifier 474. In the preferred embodiment, the voltage across the coil 202 is monitored through the error signal at the output of the second summing amplifier 452. A ninth resistor 476 connects the output of the second summing amplifier 452 to a buffer 478. A second capacitor 480 connects the junction of the ninth resistor 476 and the buffer 478 to ground. The highpass filter 472 strips the error signal of its AC or high frequency component.

The output of the buffer 478 is connected to the negative terminal of the difference amplifier 474 through a tenth resistor 482. An eleventh resistor 484 connects the junction of the tenth resistor 482 and the negative terminal of the difference amplifier 474 to ground. A twelfth resistor 486 connects the positive terminal of the difference amplifier 474 to the output of the second summing amplifier 452. A thirteenth resistor 488 connects the output of the difference amplifier 474 to the positive terminal of the difference amplifier 474. In the preferred embodiment, the tenth and twelfth resistors 482,486 have substantially equal magnitudes of R1 and the eleventh and twelfth resistors have substantially equal magnitudes of R2. An analog to digital converter (A/D) 490 connects the output of the difference amplifier to the control means 110.

The difference amplifier 474 subtracts the error signal ($V_e$) from the filtered error signal ($V_f$) and amplifies the magnitude. The output of the difference amplifier 474 ($V_0$) is:

$$V_0 = (V_f - V_e) \times R2/R1.$$

The magnitude of the resistor and capacitor values is dependent on the magnitude of the coil current, and the desired output level. For example, to amplify signals in the 10 to 200 millivolt (mv) range to 5 V, an approximate gain of 50 is needed. Resistor values of 2,000 ohms and 100,000 ohms for R1 and R2 satisfy the gain requirement.

INDUSTRIAL APPLICABILITY

With reference to the drawings and in operation, the present invention is adapted to signal a transmission controller 110 at the occurrence of an end of fill condition of an electrical solenoid operated hydraulic clutch 102. The following description is only for the purposes of illustration and is not intended to limit the present invention as such. It will be recognizable, by those skilled in the art, that the present invention is suitable for a plurality of other applications.

The transmission controller 110 controls the shifting of a transmission on a vehicle (not shown) between a plurality of gear ratios. For example, the transmission may include three forward and three reverse gear ratios.

The transmission controller 110 operates a plurality of electrical solenoids. The solenoids are adapted to engage/disengage the transmission's hydraulic clutches, such that the transmission is shifted to the desired gear ratio.

The transmission controller 110 receives information related to the desired operation of the vehicle and to the vehicle's operating environment and energizes/deenergizes the solenoids. For example, the controller 110 may receive information related to a desired or maximum gear ratio, the position of the accelerator pedal (not shown), and/or the actual speed of the vehicle.

Based on the received information, the controller 110, operates the hydraulic clutches through actuation of the solenoids in accordance with a set of programmed shift rules. For example, in response to the received information, the controller 110 requires an upshift to the third forward gear ratio. To implement this requirement, one or more clutches need to be disengaged and one or more additional clutches engaged. The exact clutch(es) to be engaged/disengaged are dependent upon the structure of the transmission.

The controller 110, begins to fill the required clutches 102, as discussed above. When a clutch 102 reaches the end of fill condition, the respective sensing means 108 signals the controller 110 that the end of fill condition has been reached and the controller 10 can begin to modulate the coil current to engage the clutch 102.

I claim:

1. An apparatus for detecting an end-of-fill condition of an actuator having a varying control volume, said end-of-fill condition corresponding to said varying control volume being pressurized to a predetermined end-of-fill pressure, comprising:
   a solenoid having a coil and an armature, said armature being movable relative to said coil in response to energization of said coil;
   valve means for delivering a flow of fluid to said actuator, said fluid flow having a rate responsive to the movement of said armature; and,
   sensing means for detecting a voltage condition of said coil and responsively producing an end-of-fill signal, said voltage condition being produced in response to said control volume achieving said predetermined end-of-fill pressure.

2. An apparatus, as set forth in claim 1, wherein said voltage condition is a voltage spike across said coil, said voltage spike being generated by an electromotive force produced by movement of said armature.

3. An apparatus, as set forth in claim 1, wherein said actuator is a hydraulically actuated clutch piston.

4. An apparatus, as set forth in claim 1, wherein said valve means includes a control valve having a spool and being connected between a source of pressurized fluid and said actuator, said spool being connected to said armature.

5. An apparatus, as set forth in claim 1, wherein said valve means includes a pilot valve connected to a source of pressurized fluid and a control valve connected between said pilot valve and said fluid actuator.

6. An apparatus, as set forth in claim 1, wherein said sensing means includes means for filtering and amplifying the voltage across said coil.

7. An apparatus, as set forth in claim 1, including feedback means for providing a restricted flow of fluid from said varying control volume back to said valve means.

8. An apparatus, as set forth in claim 7, wherein said feedback means includes means for imposing movement upon said armature in response to said varying control volume reaching said end-of-fill condition.

9. An apparatus for engaging a hydraulic clutch having a varying control volume in response to an engage signal, comprising:
- a solenoid having an armature and a coil, said armature being movable relative to said coil in response to energization of said coil;
- a control valve having a spool and being connected between a source of pressurized hydraulic fluid and said clutch, said spool being connected to said armature and being movable between a no-flow position and a full flow position in response to the movement of said armature, said control valve allowing a fluid flow to pass from said fluid source to said clutch, the rate of said fluid flow being responsive to the location of the spool between the no-flow and the full-flow position;
- control means for receiving said engage signal and for energizing said coil with a first current in response thereto;
- sensing means for detecting a voltage condition of said coil and responsively delivering an end-of-fill signal, said voltage condition being produced in response to said clutch achieving a predetermined end-of-fill pressure; and,
- wherein said control means includes means for receiving said end-of-fill signal and energizing said coil with a second current.

10. An apparatus, as set forth in claim 9, wherein said control means includes a computer.

11. An apparatus, as set forth in claim 9, wherein said control means includes a pulse width modulated driver.

12. An apparatus, as set forth in claim 9, wherein said first current has a substantially constant magnitude.

13. An apparatus, as set forth in claim 9, wherein the magnitude of said second current is linear.

14. An apparatus, as set forth in claim 13, wherein the magnitude of said second current increases for a predetermined period of time.

15. A method for detecting an end-of-fill condition of an actuator having a varying control volume, said end-of-fill condition corresponding to said varying control volume being pressurized to a predetermined end-of-fill pressure, said varying control volume being connected to a source of pressurized fluid by a control valve, said control valve being actuatable by a solenoid, said solenoid having a coil and an armature, comprising the steps of:
- energizing said coil with a first current;
- delivering a flow of fluid from said pressurized fluid to said actuator in response to the energization of said coil with said first current;
- detecting a voltage condition in said coil and responsively producing an end-of-fill signal, said voltage condition being produced in response to said control volume achieving said predetermined end-of-fill pressure.

16. A method, as set forth in claim 15, including the steps of filtering and amplifying the voltage across said coil.

17. A method for engaging a hydraulic clutch having a varying control volume in response to an engage signal, said varying control volume being connected to a source of pressurized fluid by a control valve, said control valve being actuatable by a solenoid, said solenoid having a coil and an armature(204), comprising the steps of:
- energizing said coil with a first current;
- delivering a flow of fluid from said pressurized fluid to said clutch in response to the energization of said coil with said first current;
- detecting a voltage condition of said coil and responsively delivering an end-of-fill signal, said voltage condition being produced in response to said control volume achieving a predetermined end-of-fill pressure; and,
- receiving said end-of-fill signal and responsively energizing said coil with a second current.

* * * * *